US012682756B2

(12) United States Patent
Lee

(10) Patent No.: US 12,682,756 B2
(45) Date of Patent: Jul. 14, 2026

(54) PARKING SYSTEM AND PARKING METHOD

(71) Applicants: HYUNDAI MOTOR COMPANY, Seoul (KR); KIA CORPORATION, Seoul (KR)

(72) Inventor: Yong Joon Lee, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 29 days.

(21) Appl. No.: 18/763,602

(22) Filed: Jul. 3, 2024

(65) Prior Publication Data

US 2025/0239158 A1 Jul. 24, 2025

(30) Foreign Application Priority Data

Jan. 19, 2024 (KR) ........................ 10-2024-0009108

(51) Int. Cl.
*G08G 1/14* (2006.01)
*B60W 30/06* (2006.01)
(52) U.S. Cl.
CPC ............. *G08G 1/143* (2013.01); *B60W 30/06* (2013.01); *B60W 2540/221* (2020.02); *B60W 2552/53* (2020.02)
(58) Field of Classification Search
CPC .................. G08G 1/143; B60W 30/06; B60W 2540/221; B60W 2552/53; B60W 40/02; B60W 60/0013; B60W 60/0025; B60Y 2300/06
See application file for complete search history.

(56) References Cited

U.S. PATENT DOCUMENTS

| | | | | |
|---|---|---|---|---|
| 2018/0218605 A1* | 8/2018 | Mowatt | ................. | G08G 1/144 |
| 2018/0321685 A1* | 11/2018 | Yalla | ........................ | G07C 9/38 |
| 2018/0330613 A1* | 11/2018 | Maeda | .................... | H04W 4/46 |
| 2019/0228660 A1* | 7/2019 | Amano | ............. | G02B 27/0179 |
| 2020/0156663 A1* | 5/2020 | Alvarez | ................ | B60W 30/10 |
| 2020/0163814 A1* | 5/2020 | Keller | ................... | B60W 30/06 |
| 2021/0118299 A1* | 4/2021 | Yata | ........................ | B62D 6/00 |

FOREIGN PATENT DOCUMENTS

JP 2017021747 A * 1/2017

* cited by examiner

*Primary Examiner* — Abby Lin
*Assistant Examiner* — Danielle M Jackson
(74) *Attorney, Agent, or Firm* — Lempia Summerfield Katz LLC

(57) ABSTRACT

A method of parking a vehicle occupied by a disabled person includes: generating sensing data by sensing surroundings of the vehicle and searching for empty spaces using the sensing data; categorizing each of the empty spaces into a no-parking space, a first parking space for a disabled person with a wheelchair activity space, a second parking space for the disabled person without a wheelchair activity space, and a general parking space; selecting one of the first parking space for the disabled person, the second parking space for the disabled person, or the general parking space as a target parking space; determining a parking type and a parking trajectory based on a boarding position of the disabled person and the target parking space; and moving the vehicle to the target parking space based on the parking type and the parking trajectory. The parking type is front parking or rear parking.

16 Claims, 15 Drawing Sheets

*130*

No-parking space

Parking space
for the disabled

General parking space

No-parking space

No-parking space

Parking space
for the disabled

130

PARKING SYSTEM AND PARKING METHOD

CROSS-REFERENCE TO RELATED APPLICATIONS

The present application claims priority to Korean Patent Application No. 10-2024-0009108, filed on Jan. 19, 2024 in the Korean Intellectual Property Office, the entire contents of which are incorporated herein by reference.

TECHNICAL FIELD

The present disclosure relates to a parking system and a parking method.

BACKGROUND

The contents described in this section simply provide background information for the present disclosure and do not constitute prior art.

When disabled people use a means of transportation such as a wheelchair, sufficient space is required when getting off or exiting after parking a vehicle. A parking space for the disabled includes a wheelchair activity space on one side, and thus the parking space for the disabled has a larger size than that of a general parking space. A disabled driver seated in the driver's seat and/or a disabled passenger seated in a seat other than the driver's seat can get out of or exit a vehicle more conveniently when the vehicle is parked in the parking space for the disabled than when the vehicle is parked in the general parking space.

Depending on the situation, such as when there is no parking space for the disabled or when another vehicle is already parked in the parking space for the disabled, there may be cases where a vehicle occupied by a disabled person needs to be parked in a general parking space. Since the general parking space is smaller than the parking space for the disabled, once parking is completed, it may be very difficult or impossible for the disabled person to get out of or exit the vehicle because there is no space to place a wheelchair.

In the case of parking a vehicle occupied by a disabled person, a space available for the disabled person to get out of or exit the vehicle needs to be taken into account. This may reduce the convenience of parking and reduce user experience. In addition, when parking is completed, determining whether there is enough space to get out of or exit the vehicle requires considerable skill on the part of the driver. Thus, the difficulty of parking is increased.

There is a need for a parking method or a parking system that provides a quality user experience by increasing parking convenience for a vehicle occupied by a disabled person. In particular, there is a need for a parking method or a parking system, which determines a parking direction and/or a parking trajectory and performs parking by considering a space available for the disabled person to conveniently get out of or exit a vehicle without requiring the driver to make complex calculations or judgments for parking.

SUMMARY

In view of the above, the present disclosure provides a parking method and a parking system that increase parking convenience for a vehicle occupied by a disabled person and provide a quality user experience.

In addition, the present disclosure provides a parking method that allows a disabled person to conveniently get out of or exit a vehicle.

Further, the present disclosure provides a parking method and a parking system that provides parking convenience by calculating a space available for a disabled person to get out of or exit a vehicle and to place a wheelchair.

The objects to be achieved by the present disclosure are not limited to the objects mentioned above. Other objects not mentioned should be clearly understood by those having ordinary skill in the art from the description below.

According to the embodiments of the present disclosure described above, the parking method and the parking system can increase parking convenience for a vehicle occupied by a disabled person and can provide a quality user experience.

In addition, it is possible to provide the parking method that allows a disabled person to conveniently get out of or exit a vehicle.

Further, the parking method and the parking system can perform parking by calculating a space available for a disabled person to get out of or exit a vehicle and can place a wheelchair without requiring the driver to make complex calculations or judgments for parking.

Furthermore, the parking method and the parking system can automatically determine the parking type and parking trajectory and can automatically perform parking. Thus, contact accidents when parking may be reduced.

DETAILED DESCRIPTION

Figure 1:
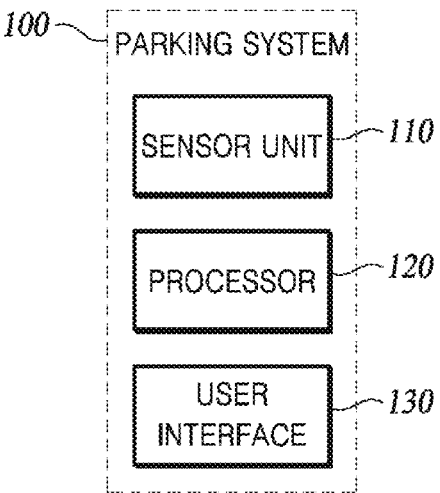
FIG. 1 is a functional block diagram of a parking system according to one embodiment of the present disclosure.

Hereinafter, embodiments of the present disclosure are described in detail with reference to the accompanying drawings. In the following description, like reference numerals designate like elements, although the elements are shown in different drawings. Further, in the following description of some embodiments, a detailed description of known functions and configurations incorporated therein has been omitted for the purpose of clarity and for brevity.

Additionally, various terms such as first, second, A, B, (a), (b), etc., are used solely to differentiate one component from the other but not to imply or suggest the substances, order, or sequence of the components. Throughout the present disclosure, when a part 'includes' or 'comprises' a component, the part is intended to further include other components and not intended to exclude other components unless specifically stated to the contrary. The terms such as 'unit', 'module', and the like refer to one or more units for processing at least one function or operation, which may be implemented by hardware, software, or a combination thereof.

Each element of the apparatus or method in accordance with the present disclosure may be implemented in hardware, software, or a combination of hardware and software. The functions of the respective elements may be implemented in software, and a microprocessor may be implemented to execute the software functions corresponding to the respective elements. When a controller, module, component, device, element, or the like of the present disclosure is described as having a purpose or performing an operation, function, or the like, the controller, module, component, device, element, or the like should be considered herein as being "configured to" meet that purpose or to perform that operation or function. Each controller, module, component, device, element, and the like may separately embody or be included with a processor and a memory, such as a non-transitory computer readable media, as part of the apparatus.

FIG. 1 is a functional block diagram of a parking system according to one embodiment of the present disclosure.

Figure 2:
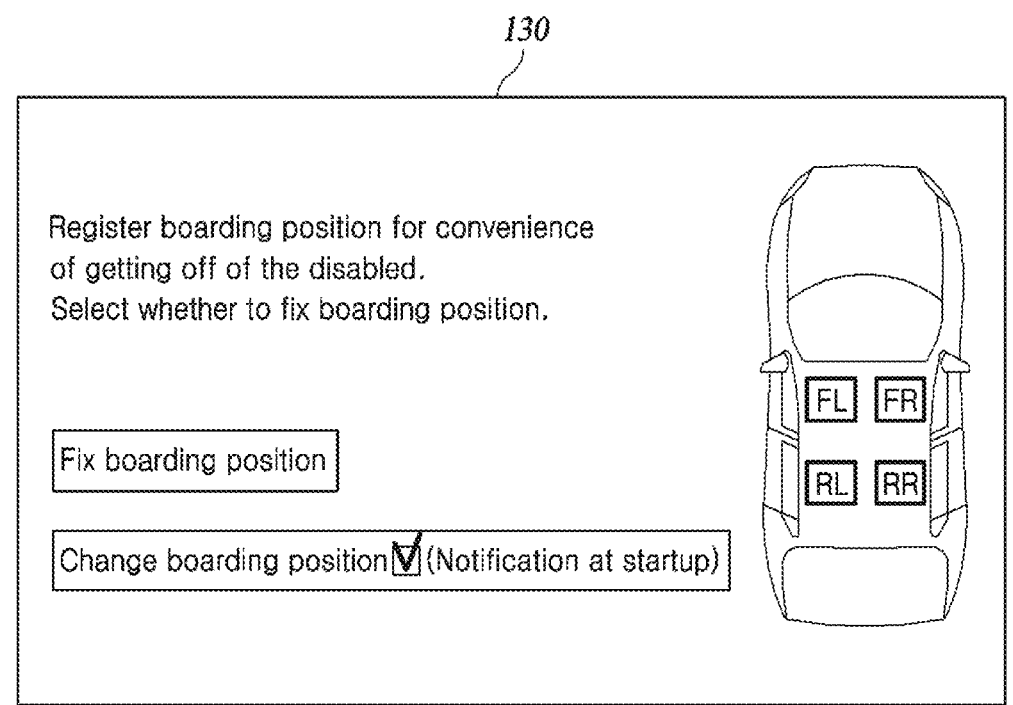
FIG. 2 is a diagram illustrating a user interface according to one embodiment of the present disclosure.

FIG. 2 is a diagram illustrating a user interface according to one embodiment of the present disclosure.

Figure 3:
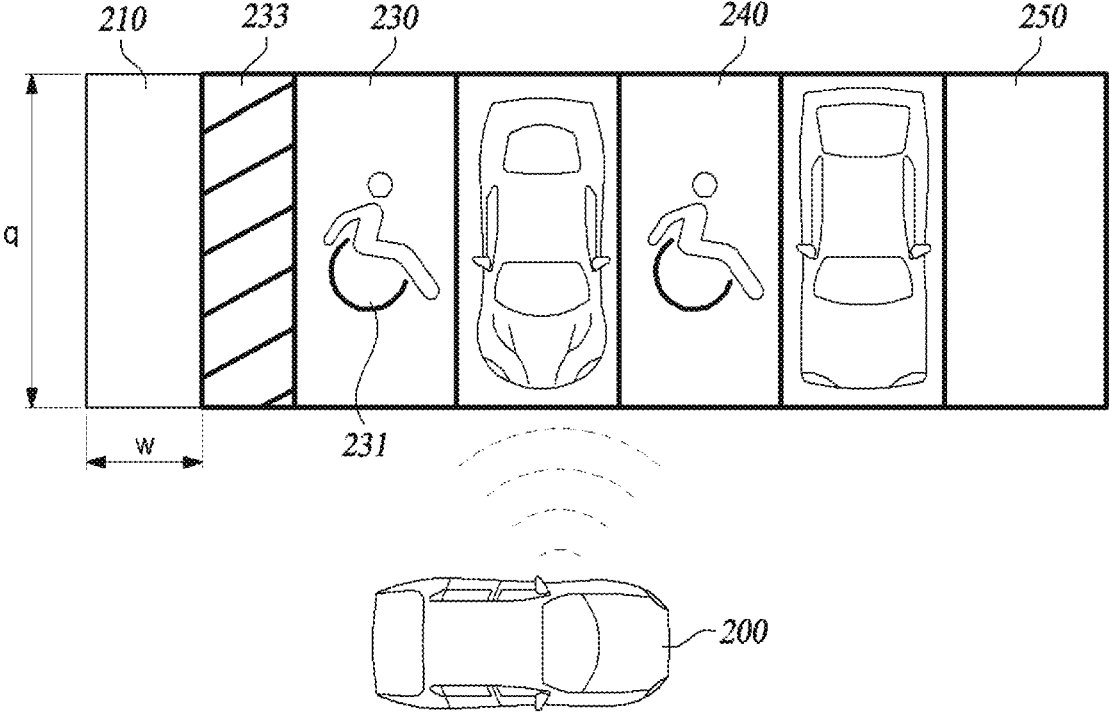
FIG. 3 is a diagram for explaining how the parking system according to one embodiment of the present disclosure determines a type of parking space.

FIG. 3 is a diagram for explaining how the parking system according to one embodiment of the present disclosure determines a type of parking space.

Figure 4A:
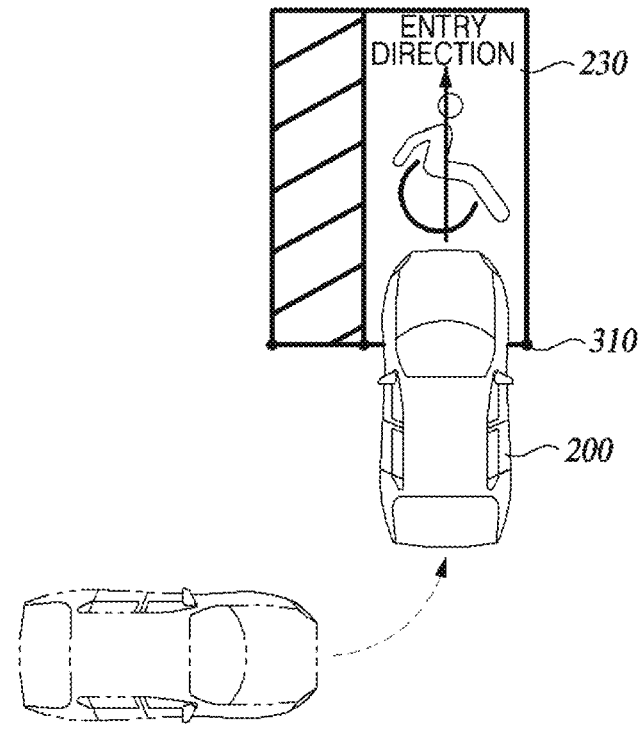
FIGS. 4A and 4B are diagrams illustrating a case of parking in a first parking space for a disabled person according to one embodiment of the present disclosure.
Figure 4B:
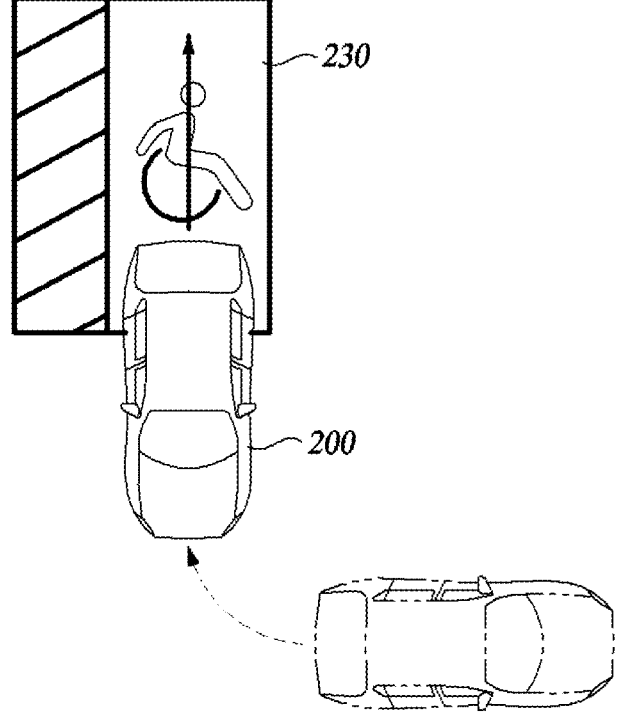

FIGS. 4A and 4B are diagrams illustrating a case of parking in a first parking space for a disabled person according to one embodiment of the present disclosure.

Figure 5A:
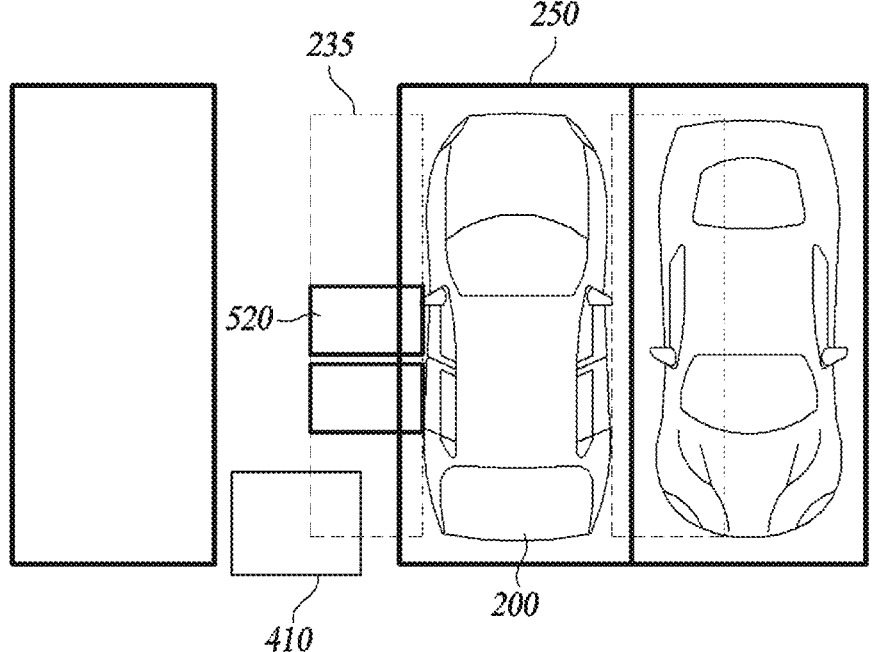
FIGS. 5A and 5B are diagrams illustrating a case of parking in a general parking space according to one embodiment of the present disclosure.
Figure 5B:
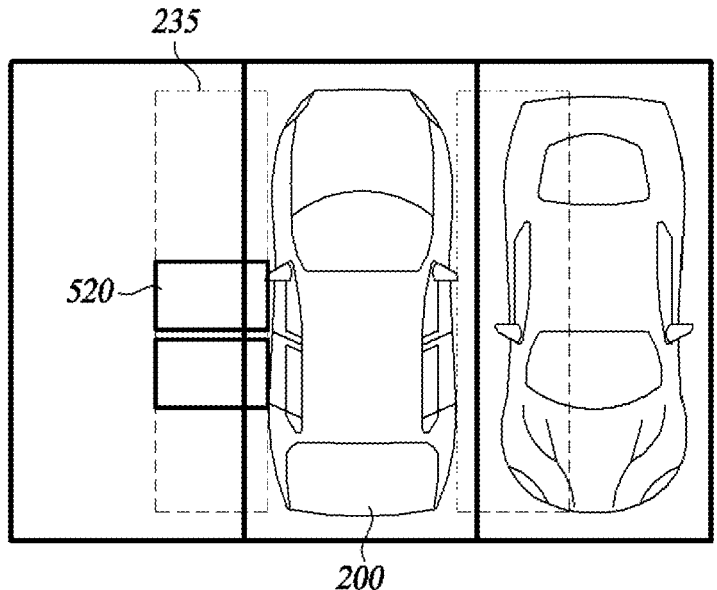

FIGS. 5A and 5B are diagrams illustrating a case of parking in a general parking space according to one embodiment of the present disclosure.

Figure 6A:
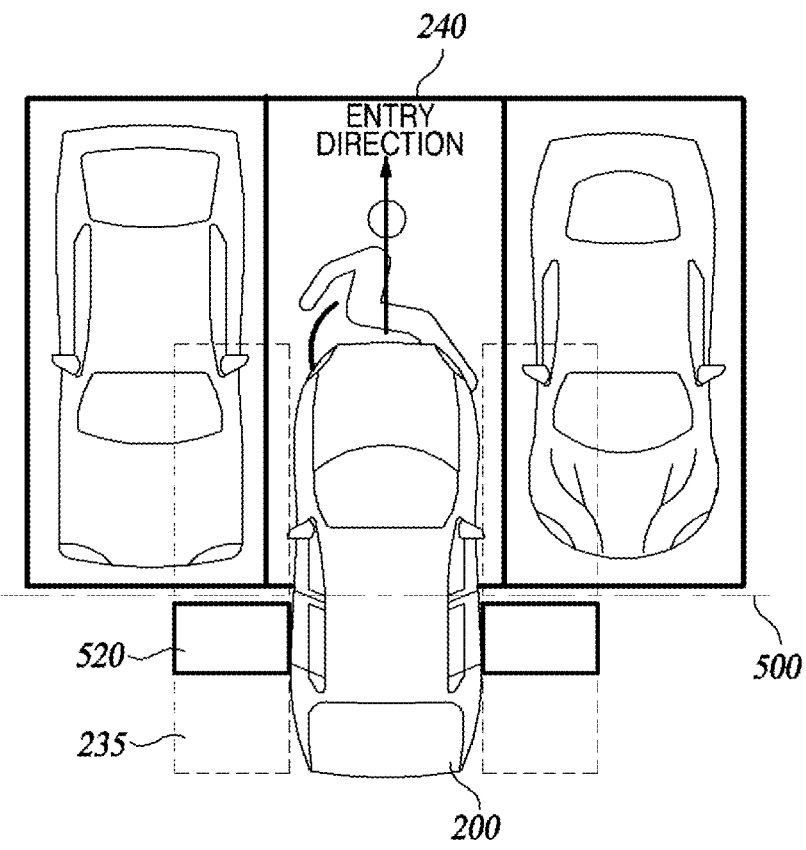
FIGS. 6A and 6B are diagrams illustrating front parking when it is not possible to get off a vehicle in a target parking space according to one embodiment of the present disclosure.
Figure 6B:
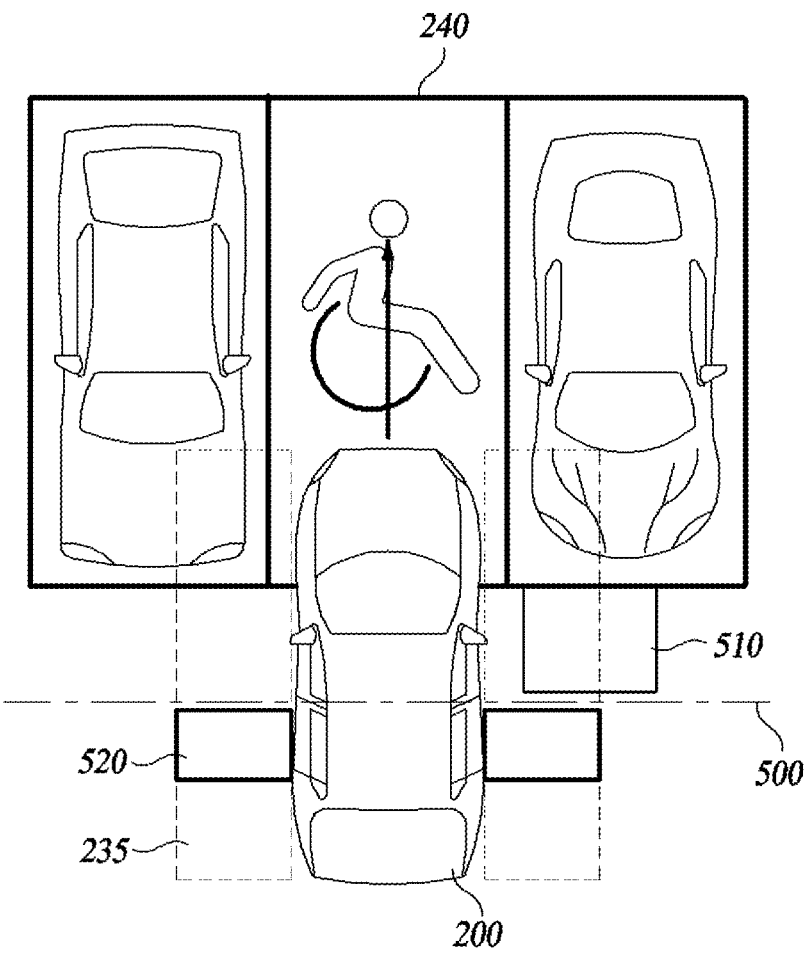

FIGS. 6A and 6B are diagrams illustrating front parking when it is not possible to get out of or exit a vehicle in a target parking space according to one embodiment of the present disclosure.

Figure 7A:
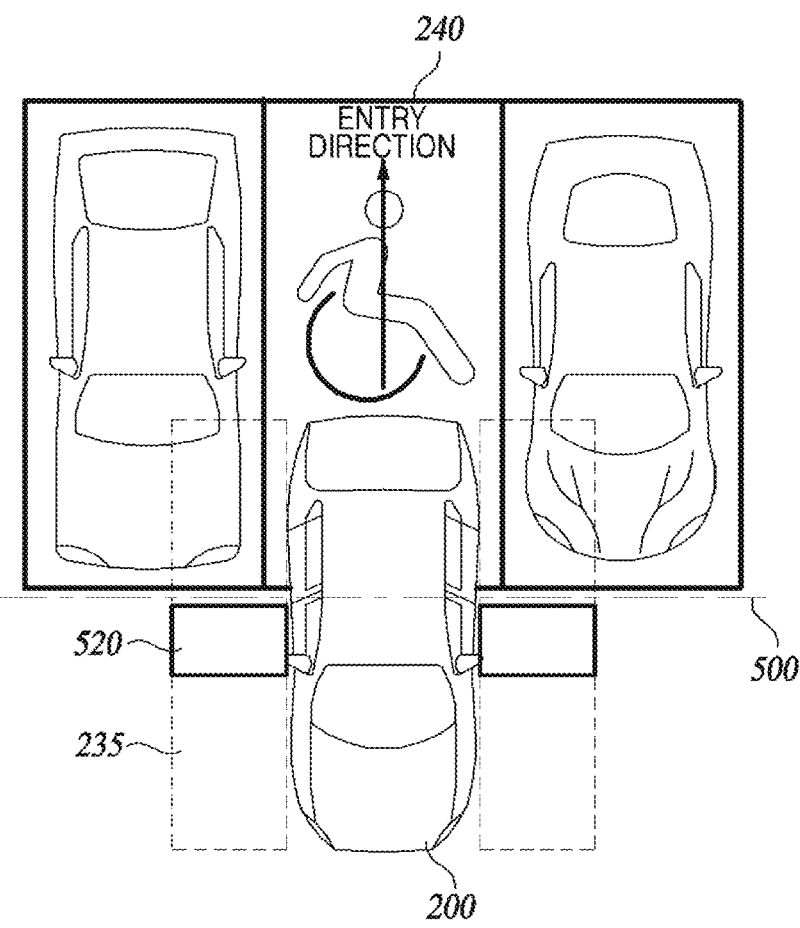
FIGS. 7A and 7B are diagrams illustrating rear parking when it is not possible to get out of or exit the vehicle in the target parking space according to one embodiment of the present disclosure.
Figure 7B:
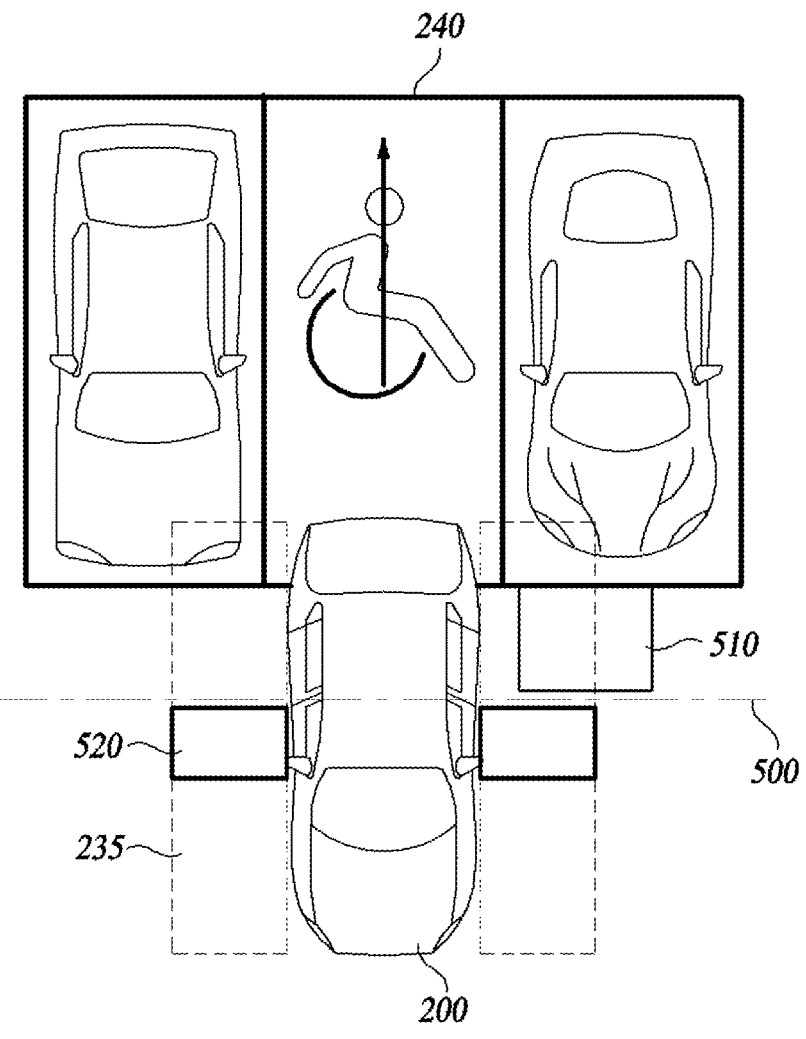

FIGS. 7A and 7B are diagrams illustrating rear parking when it is not possible to get out of or exit a vehicle in the target parking space according to one embodiment of the present disclosure.

Figure 8:
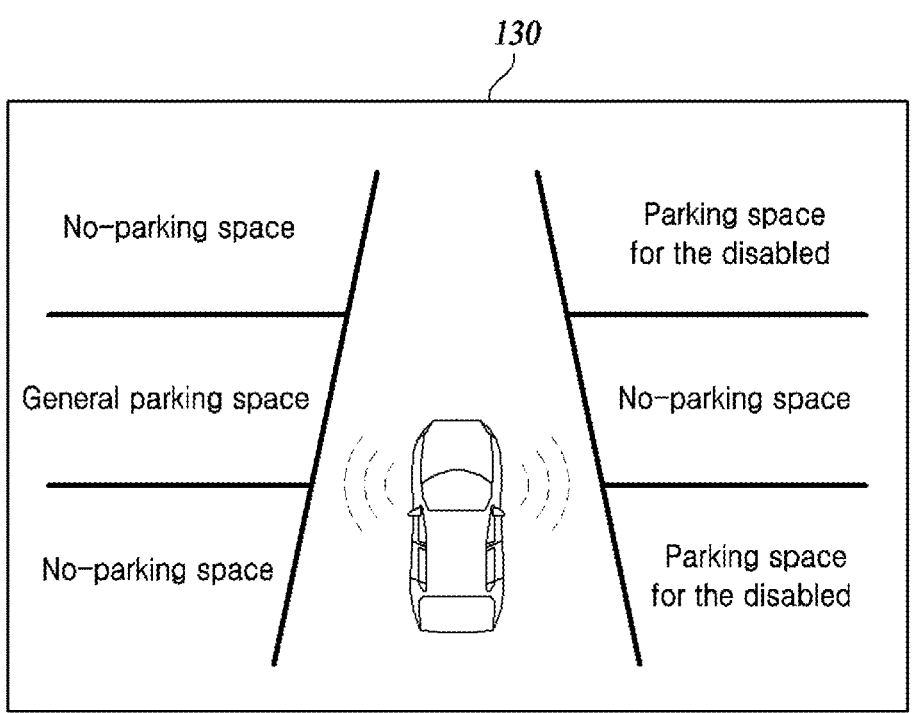
FIGS. 8 and 9 are diagrams illustrating a user interface according to one embodiment of the present disclosure.
Figure 9:
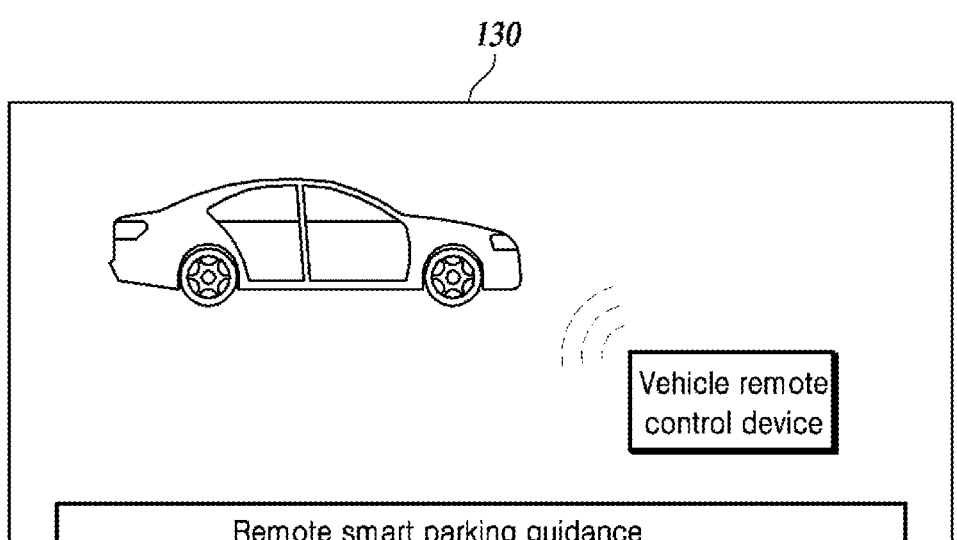

FIGS. 8 and 9 are diagrams illustrating a user interface according to one embodiment of the present disclosure.

Referring to FIGS. 1-9, a parking system 100 may include a sensor unit 110, a processor 120, a user interface 130, and the like. According to one embodiment, the parking system 100 may be mounted on a vehicle 200.

The sensor unit 110 may generate sensing data by sensing the surroundings of the vehicle 200. The sensor unit 110 may detect the getting off of an occupant and the closing of a door. The sensor unit 110 may include all or some of a camera, a Light Detection And Ranging (LIDAR), and a Radio Detecting And Ranging (RADAR). A plurality of cameras may be disposed in the vehicle 200. Components of the sensor unit 110 may be disposed at a front, a rear, a front side, or a rear side, etc. of the vehicle 200.

The processor 120 controls the movement of the vehicle 200. The processor 120 may search for empty spaces around the vehicle 200 using sensing data. The processor 120 categorize each of the empty spaces as a no-parking space 210, a first parking space 230 for the disabled with a wheelchair activity space 233, a second parking space 240 for the disabled with no wheelchair activity space, and a general parking space 250. According to one embodiment, the processor 120 may categorize the parking spaces using an artificial intelligence (AI) engine.

As used herein, to get off, get out of, or exit a vehicle means for a person inside a vehicle passenger compartment or other vehicle passenger space to disembark from and leave the vehicle. These various terms as used herein are not intended to differ. The processor 120 may determine whether it is possible to get off the vehicle 200 in the selected target parking space. The processor 120 may determine a parking type and a parking trajectory based on the boarding position of the disabled person and the target parking space. The processor 120 may control the vehicle 200 and move the vehicle 200 to the target parking space based on the parking type and the parking trajectory.

When the target parking space is the first parking space 230 for the disabled, the processor 120 may determine the parking type and the parking trajectory so that the boarding position of the disabled person corresponds to the wheelchair activity space 233 when parking is completed.

When the general parking space 250 or the second parking space 240 for the disabled is selected as the target parking space and it is determined that it is possible to get off the vehicle 200 in the selected target parking space, the processor 120 may determine the parking type and the parking trajectory so that the boarding position of the disabled person corresponds to an obstacle-free area in first reference spaces 235.

When it is determined that it is not possible to get off the vehicle 200 in the target parking space, the processor 120 may stop the vehicle 200 when a part of the vehicle 200 enters the target parking space and may move the vehicle 200 again when all occupants of the vehicle have got off the vehicle 200.

The user interface 130 may be disposed inside the vehicle 200. Referring to FIG. 2, the user interface 130 may include an input means for manually registering and changing the boarding position of a disabled person. According to one embodiment, the user may select or change the boarding position by touching a screen of the user interface 130.

Referring to FIG. 8, the user interface 130 displays on the screen the no-parking space 210, the first parking space 230 for the disabled, the second parking space 240 for the disabled, and the general parking space 250 based on the boarding position of the disabled person. In this case, the occupant may select one of the parking spaces displayed on the user interface 130 as the target parking space by touching it.

Referring to FIG. 9, the user interface 130 may guide occupants of the vehicle 200 to get off the vehicle 200. For example, when the vehicle 200 is completely parked in the target parking space, the user interface 130 may output a visual or auditory message to guide getting off. For example, when the vehicle 200 stops in a state in which a portion of the vehicle 200 has entered the target parking space, the user interface 130 may guide the occupants of the vehicle to get off the vehicle 200 with a vehicle remote control device.

Figure 10:
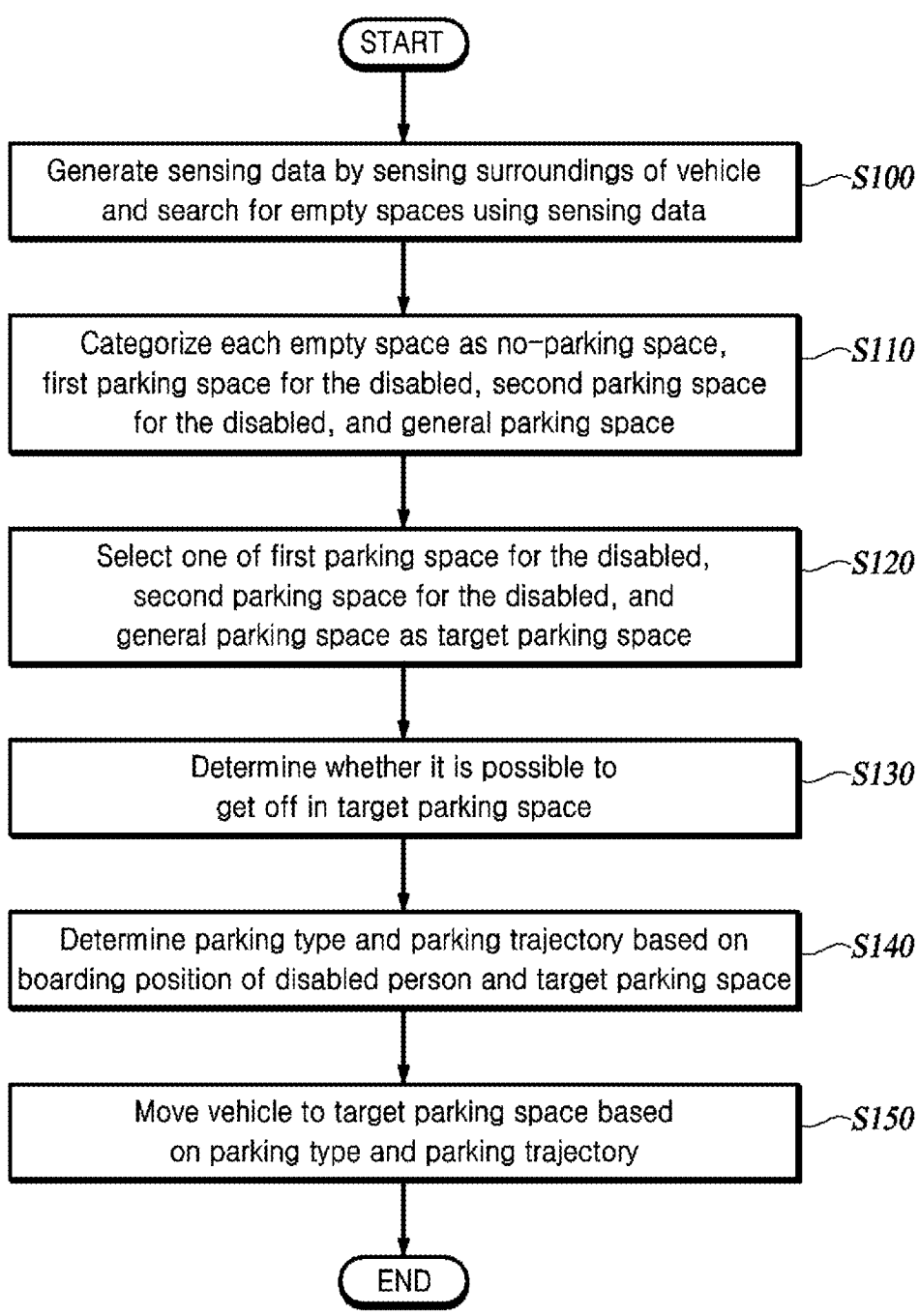
FIG. 10 is a flowchart showing a parking method according to one embodiment of the present disclosure.

FIG. 10 is a flowchart showing a parking method according to one embodiment of the present disclosure.

Referring to FIGS. 1-10, in a vehicle 200 in which a disabled person rides, the parking system 100 determines a parking type and a parking trajectory based on the position of the disabled person, the type of parking space (parking space for the disabled or general parking space), and/or an available area of the parking space, etc. The parking system 100 can determine the parking type and the parking trajectory for the convenience of getting off the vehicle of the disabled person when parking is performed.

Referring to FIG. 2, the parking system 100 may register the boarding position of the disabled person using the user interface 130. In the present disclosure, the boarding position of the disabled person may be defined as follows. The boarding position of the disabled person is divided into front/rear and left/right. For example, in the case of a 4-passenger vehicle, there are a front left seat (hereinafter, referred to as "FL"), a front right seat (hereinafter, referred to as "FR"), a rear left seat (hereinafter, referred to as "RL"), and a rear right seat (hereinafter, referred to as "RR").

According to one embodiment, a desired seat among FL, FR, RL, and RR may be registered as the boarding position of the disabled person using the user interface 130.

According to one embodiment, when the disabled person is the driver, the boarding position may be registered as FL using the user interface 130. If the driver's seat is FR, the boarding position may be registered as FR.

According to one embodiment, when the disabled person is a passenger rather than a driver, the boarding position may be fixed to a desired position using the user interface 130. Such a fixed boarding position is convenient because there is no need to change the boarding position each time.

According to one embodiment, without fixing the boarding position, it is possible to select a desired boarding position each time by having a change notification pop-up on the user interface 130 each time the user boards.

Hereinafter, the parking method performed by the parking system 100 is described in detail.

Referring to FIG. 3 and FIG. 10, the parking system 100 may generate sensing data by sensing the surroundings of the vehicle 200 and may perform a search process of searching for empty spaces using the sensing data (S100). The parking system 100 may perform a categorization process of categorizing each empty space as the no-parking space 210, the first parking space 230 for the disabled, the second parking space 240 for the disabled, and the general parking space 250 (S110).

According to one embodiment, the parking system 100 may perform the process S110 using an AI engine learned to distinguish parking spaces.

In this case, the first parking space 230 for the disabled refers to a parking space for the disabled with the wheelchair activity space 233. The second parking space 240 for the disabled refers to a parking space without the wheelchair activity space 233, a parking space whose wheelchair activity space 233 cannot be used due to the presence of another object such as another vehicle in the wheelchair activity space 233, or a parking space where a wheelchair cannot be placed due to insufficient space for any other reason. The general parking space 250 refers to a usual parking space that is not a parking space for the disabled.

The parking system 100 may determine whether the empty space is the no-parking space 210 based on a width w and a length q of the empty space. For example, among empty spaces, a place where the width w is less than a critical width or the length q is less than a critical length may be determined as the no-parking space 210.

The parking system 100 may determine an empty space as an available parking space when the width w of the empty space is greater than or equal to the critical width and the length q of the empty space is greater than or equal to the critical length.

The parking system 100 determines a place where a disabled mark 231 and a hatched pattern are detected as the first parking space 230 for the disabled among the available parking spaces. In this case, the hatched pattern refers to a straight line pattern drawn at a predetermined angle in the wheelchair activity space 233.

The parking system 100 determines a place where only the disabled mark 231 is detected among the available parking spaces as the second parking space 240 for the disabled. In other words, when there is no wheelchair activity space 233, or when the wheelchair activity space 233 cannot be used because another object such as another vehicle exists in the wheelchair activity space 233, or when a wheelchair cannot be placed due to insufficient space for any other reason, it is determined as the second parking space 240 for the disabled.

In this case, the size, shape, and position of the disabled mark 231 are not limited by the disclosure of the drawings. A mark displayed in a parking lot to recognize that it is a parking space for the disabled may correspond to a mark for the disabled regardless of size, shape, and position.

The parking system 100 may perform a selection process of selecting one of the first parking space 230 for the disabled, the second parking space 240 for the disabled, or the general parking space 250 as a target parking space (S120).

While it is possible for the parking system 100 to automatically select a target parking space and perform the process S120, since the parking system 100 includes the user interface 130, it is also possible for the user to manually select a target parking space using the user interface 130. For example, as shown in FIG. 8, the user interface 130 may display one or more of the no-parking space, the first parking space 230 for the disabled, the second parking space 240 for the disabled, and the general parking space 250 based on the boarding position of the disabled person on the screen. The user may select one of the parking spaces displayed on the user interface 130 as a target parking space.

The parking system 100 may determine whether it is possible to get off the vehicle 200 in the target parking space (S130). Specifically, the parking system 100 may determine that it is possible to get off the vehicle 200 when at least one of the first reference spaces 235 has no obstacle. In this case, a first reference space 235 is a space of a predetermined size located on both sides of the vehicle 200, assuming that the vehicle 200 is completely parked in the target parking space. For example, in the case of FIG. 5A, it can be determined that it is not possible to get off the vehicle 200 on the right side due to the presence of another vehicle in the first reference space 235 on the right, but it is possible to get off the vehicle 200 on the left side since there is space to fully open the left door despite of the presence of a parking lot pillar 410 in the first reference space 235 on the left. In the case of FIG. 5B, it can be determined that it is possible to get off the vehicle 200 on the left side since there is no object in the first reference space 235 on the left while it is not possible to get off the vehicle 200 on the right side due to the presence of another vehicle in the first reference space 235 on the right.

The first reference space 235 is not limited to the shape, size, and location shown in the drawings. The shape, size, and location of the first reference space 235 may be set differently depending on the vehicle specifications, etc. The first reference space 235 may be determined to have a suitable location, shape, and size to determine whether a space exists for a disabled person to get off the vehicle 200.

The parking system 100 may determine a parking type and a parking trajectory based on the boarding position of the disabled person and the target parking space (S140). In the present disclosure, the parking type means front parking or rear parking. For the parking type, the parking system 100 determines the parking type that is relatively easy for the disabled person to get off the vehicle 200.

With reference to FIGS. 4A and 4B, a method of performing the processes S140 and S150 when the first parking space 230 for the disabled is selected as the target parking space in the process S120 is described. FIG. 4A shows a case of front parking in the first parking space 230 for the disabled, and FIG. 4B shows a case of rear parking in the first parking space 230 for the disabled. When the first parking space 230 for the disabled is selected as the target parking space in the process S120, the process S140 may be a process of determining the parking type and the parking trajectory so that the boarding position of the disabled person corresponds to the wheelchair activity space 233.

For example, in case that there is a wheelchair activity space 233 on the left side of the entry direction of the first parking space for the disabled, the process S140 may be a process of determining the parking type as front parking as shown in FIG. 4A when the boarding position of the disabled person is the left seat FL or RL. In this case, the entry direction refers to the moving direction of the vehicle 200 passing through a straight line where entry points 310 are arranged.

For example, when the wheelchair activity space 233 exists on the left side of the entry direction of the first parking space 230 for the disabled, the process S140 may be a process of determining the parking type as rear parking as shown in FIG. 4B when the boarding position of the disabled person is the right seat FR or RR.

Although not shown in the drawings, when the first parking space 230 for the disabled is the target parking space and there is a wheelchair activity space 233 on the right side of the entry direction of the first parking space 230 for the disabled, the process S140 may be a process of determining the parking type as rear parking when the disabled person's boarding position is the left seat.

Although not shown in the drawings, when the first parking space 230 for the disabled is the target parking space and there is a wheelchair activity space 233 on the right side of the entry direction of the first parking space 230 for the disabled, the process S140 may be a process of determining the parking type as front parking when the disabled person's boarding position is the right seat.

By performing the process S140 as above when the first parking space 230 for the disabled is the target parking space, when parking is completed through the process S150, the door of the vehicle to be used by the disabled person when getting off the vehicle 200 is disposed in the wheelchair activity space 233, so the convenience of getting off the vehicle for the disabled person can be improved.

The parking system 100 moves the vehicle 200 to the target parking space based on the parking type and the parking trajectory determined in the process S140 (S150), and parking is completed.

In the present disclosure, the entry direction and the parking type are different concepts. The front parking means that the front part of the vehicle 200 enters the parking space first to park. The rear parking means the rear part of the vehicle 200 enters the parking space first to park. The entry direction refers to the direction in which the vehicle 200 moves when entering the target parking space. The entry directions in FIGS. 4A and 4B are the same, but FIG. 4A is front parking and FIG. 4B is rear parking.

FIGS. 5A and 5B are diagrams illustrating a case of parking in a general parking space according to one embodiment of the present disclosure.

With reference to FIGS. 5A and 5B, a method of performing the processes S140 and S150 when there is no wheelchair activity space 233 but it is determined that it is possible to get off the vehicle 200 in the target parking space is described.

First, some examples are given to explain what it means when there is no wheelchair activity space 233 but it is determined that it is possible to get off the vehicle 200 in the target parking space. For example, in the case where the second parking space 240 for the disabled or the general parking space 250 is selected as the target parking space, (1) when there is an obstacle-free space among the first reference spaces 235 of the target parking space; or (2) when there is a space 520 without obstacle where a wheelchair can be placed on the side of the door among the first reference spaces 235 of the target parking space, the parking system 100 determines that it is possible to get off the vehicle 200. For example, in the case of FIG. 5A, it may be determined that it is possible to get off the vehicle 200 on the left side while it is not possible to get off the vehicle 200 on the right side due to the presence of another vehicle in the first reference space 235 on the right. The parking system 100 may determine that it is possible to get off the vehicle 200 on the left side since there is space to fully open the left door despite of the presence of a parking lot pillar 410 in the first reference space 235 on the left and there is the space 520 for placing a wheelchair. If, unlike in FIG. 5A, the parking lot pillar 410 is located right next to the door of the vehicle, it would be determined that it is not possible to get off the vehicle 200. This is because the door cannot be fully opened and the wheelchair cannot be placed due to the parking lot pillar 410.

In the case of FIG. 5B, the parking system 100 may determine that it is possible to get off the vehicle 200 on the left side since there is no object in the first reference space 235 on the left while it is not possible to get off the vehicle 200 on the right side due to the presence of another vehicle in the first reference space 235 on the right.

As described above, when either the second parking space 240 for the disabled or the general parking space 250 is selected as the target parking space (S120), and it is determined that it is possible to get off the vehicle 200 in the target parking space (S130), the process S140 may be a process of determining the parking type and the parking trajectory so that the boarding position of the disabled person corresponds to an obstacle-free space among the first reference spaces 235. For example, as shown in FIG. 5A, in case that an obstacle-free space exists on the left side of the entry direction of the target parking space among the first reference spaces 235, the process S140 may be a process of determining the parking type as front parking when the boarding position of the disabled person is the left seat FL or RL. For example, as shown in FIG. 5B, in case that an obstacle-free space exists on the left side of the entry direction of the target parking space among the first reference spaces 235, the process S140 may be a process of determining the parking type as rear parking when the boarding position of the disabled person is the right seat FR or RR. In the case of FIG. 5A, as described above, there is the space 520 on the left side of the entry direction where the disabled person can get off the vehicle 200 and a wheelchair can be placed, so that the parking type can be determined as front parking when the disabled person seats on the left seat FL or RL, and the parking type can be determined as rear parking when the disabled person seats on the right seat FR or RR.

Although not shown in the drawings, in case that an obstacle-free space exists on the right side of the entry direction of the target parking space among the first reference spaces 235, in the process S140, the parking type can be determined as rear parking when the boarding position of the disabled person is the left seat FL or RL.

Although not shown in the drawings, in case that an obstacle-free space exists on the right side of the entry direction of the target parking space, in process S140 among the first reference spaces 235, in the process S140, the parking type can be determined as front parking when the boarding position of the disabled person is the right seat FR or RR.

When either the second parking space 240 for the disabled or the general parking space 250 is selected as the target parking space, and it is determined that it is possible to get off the vehicle 200 in the target parking space, by performing the process S140 as above, the door of the vehicle to used by the disabled person when getting off the vehicle 200 is placed in the first reference space 235 without obstacles when parking is completed through the process S150, so that the convenience of the disabled person getting off can be improved.

The parking system 100 moves the vehicle 200 to the target parking space based on the parking type and the parking trajectory determined in the process S140 (S150), and the parking is completed.

FIGS. 6A and 6B are diagrams illustrating front parking when it is not possible to get off the vehicle 200 in the target parking space according to one embodiment of the present disclosure.

FIGS. 7A and 7B are diagrams illustrating rear parking when it is not possible to get off the vehicle 200 in the target parking space according to one embodiment of the present disclosure.

Wither reference to FIGS. 6A-7B, a method of performing the processes S140 and S150 in the case where it is not possible to get off the vehicle 200 in the target parking space is described.

Specifically, when either the second parking space 240 for the disabled or the general parking space 250 is selected as the target parking space (S120), and it is determined that it is not possible to get off the vehicle 200 in the target parking space (S130), the process S140 may be a process of determining the parking type as rear parking as shown in FIGS. 7A and 7B when the disabled person's boarding position is the front seat FL or FR, and determining the parking type as front parking as shown in FIGS. 6A and 6B when the disabled person's boarding position is the rear seat RF or RR. The reason for determining the parking type differently depending on the boarding position of the disabled person is to allow the disabled person to get off the vehicle 200 while the vehicle 200 enters in the target parking space as much as possible when performing the process S150 to be described below. A detailed description of this is described below with reference to FIG. 11.

The parking system 100 may perform a movement process of moving the vehicle 200 to the target parking space based on the parking type and the parking trajectory (S150).

Figure 11:
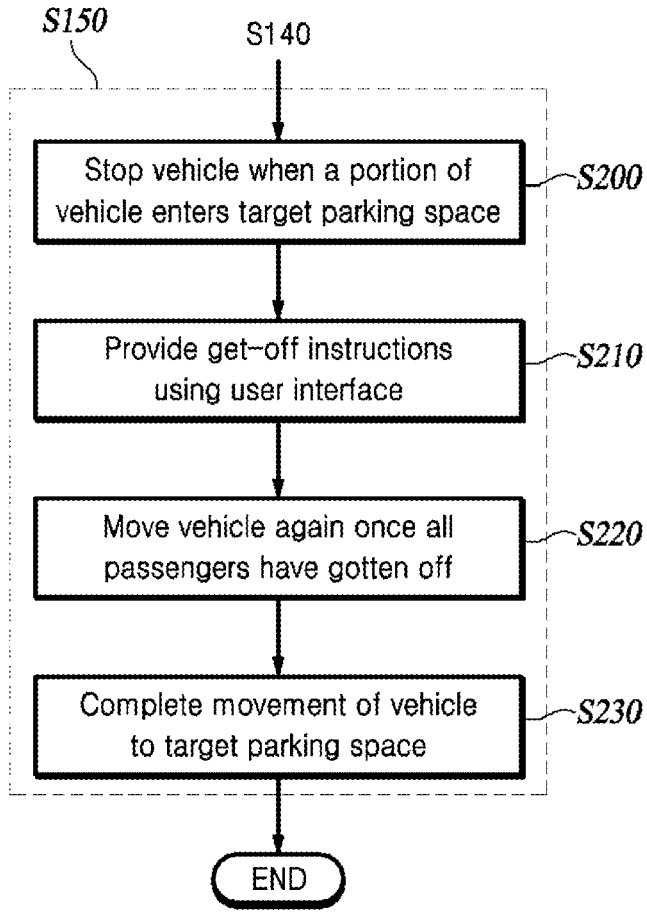
FIG. 11 is a flowchart showing the detailed steps of process S150 when it is determined that it is not possible to get out of or exit a vehicle in a target parking space.

FIG. 11 is a flowchart showing the detailed steps of the process S150 when it is determined that it is not possible to get off the vehicle 200 in the target parking space.

With reference to FIG. 11, the process S150 when it is not possible to get off the vehicle 200 in the target parking space is described in more detail.

The process S150 performs all or some of steps S200 to S230. The parking system 100 may stop the vehicle 200 when a portion of the vehicle 200 enters the target parking space (S200). When the vehicle 200 is stopped, the parking system 100 may provide get-off instructions using the user interface (S210). The parking system 100 may move the vehicle 200 again once all passengers have gotten off (S220). The parking system 100 may complete the movement of the vehicle 200 to the target parking space (S230). In other words, the parking is completed through step S230.

According to one embodiment, the parking system 100 may stop the vehicle 200 just before an imaginary first straight line 500 passing through the vehicle 200 enters the target parking space as shown in FIG. 6A and FIG. 7A, and the parking system 100 may move the vehicle 200 again once all occupants of the vehicle have gotten off. The reason for stopping the vehicle 200 just before the imaginary first straight line 500 enters the target parking space is because if the vehicle 200 stops after the imaginary first straight line 500 enters the target parking space, it would be difficult or impossible for a disabled person to open the door and place the wheelchair, or to get off the vehicle 200. In other words, the imaginary first straight line 500 is a reference line that distinguishes whether getting off the vehicle 200 is possible or not. In a state where the imaginary first straight line 500 does not enter the target parking space, the door can be fully opened, and there is a space 520 where a wheelchair can be placed. In a state where the imaginary first straight line 500 enters the target parking space, the door cannot be fully opened or a wheelchair cannot be placed next to the door due to insufficient space. According to one embodiment, the imaginary first straight line 500 may be a straight line passing through the B pillar of the vehicle 200 as shown in FIGS. 6A-7B but is not limited thereto. The position of the imaginary first straight line 500 may be different depending on the vehicle specifications and the location of the vehicle door.

When the vehicle 200 stops just before the imaginary first straight line 500 enters the target parking space, the disabled person can get off the vehicle 200 and board a wheelchair, and traffic obstruction can be minimized since a portion of the vehicle 200 has entered the target parking space.

When an obstacle 510 exists as shown in FIG. 6B and FIG. 7B, the parking system 100 may stop the vehicle just before the imaginary first straight line 500 touches the obstacle 510 and may move the vehicle 200 again once all occupants of the vehicle have gotten off.

Some of step S220 or S230 may be performed using a vehicle remote control device (FIG. 9). For example, some of step S220 or S230 may be performed using a smart key or digital key corresponding to the vehicle remote control device. The smart key and the digital key are only examples of tools for remotely controlling the vehicle 200, and the vehicle remote control device according to the present disclosure is not limited to the smart key. For example, an occupant may manually move the vehicle 200 again using the vehicle remote control device. For example, the occupant may get off the vehicle with the vehicle remote control device, and may close the door and move the vehicle 200 by pressing a button of the vehicle remote control device.

Various implementations of systems and techniques described herein may be realized as digital electronic circuits, integrated circuits, field programmable gate arrays (FPGAs), application specific integrated circuits (ASICs), computer hardware, firmware, software, and/or combinations thereof. These various implementations may include one or more computer programs executable on a programmable system. The programmable system includes at least one programmable processor (which may be a special-purpose processor or a general-purpose processor) coupled to receive and transmit data and instructions from and to a storage system, at least one input device, and at least one output device. The computer programs (also known as programs, software, software applications or codes) contain commands for a programmable processor and are stored in a "computer-readable recording medium".

The computer-readable recording medium includes all types of recording devices in which data readable by a computer system is stored. Such a computer-readable recording medium may be a non-volatile or non-transitory medium, such as ROM, CD-ROM, magnetic tape, floppy disk, memory card, hard disk, magneto-optical disk, or a storage device, and may further include a transitory medium such as a data transmission medium. In addition, the computer-readable recording medium may be distributed in a computer system connected via a network, so that computer-readable codes may be stored and executed in a distributed manner.

Various implementations of systems and techniques described herein may be embodied by a programmable computer. Here, the computer includes a programmable processor, a data storage system (including volatile memory, non-volatile memory, or other types of storage systems, or combinations thereof) and at least one communication interface. For example, the programmable computer may be one of a server, a network device, a set top box, an embedded device, a computer expansion module, a personal computer, a laptop, a personal data assistant (PDA), a cloud computing system, or a mobile device.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, one of ordinary skill should understand that the scope of the present disclosure should not be limited by the above explicitly described embodiments but by the claims and equivalents thereof.

What is claimed is:

1. A method of parking a vehicle occupied by a disabled person, the method comprising:

in a search process, generating sensing data by sensing surroundings of the vehicle and searching for empty spaces using the sensing data;

in a categorization process;

determining an empty space having a width less than a critical width or having a length less than a critical length, among the empty spaces, as a no-parking space; and determining an empty space in which a disabled mark and a hatched pattern are detected, and in which a sufficient space is available for placing a wheelchair, among the empty spaces, as a first parking space for the disabled person;

determining an empty space in which only the disabled mark is detected and the hatched pattern is not detected, or in which the disabled mark is detected but the space is insufficient for placing a wheelchair, among the empty spaces, as a second parking space for the disabled person; and categorizing each of the empty spaces into the no-parking space, the first parking space for the disabled person with a wheelchair activity space, the second parking space for the disabled person without the wheelchair activity space, and a general parking space;

in a selection process, selecting one of the first parking space for the disabled person, the second parking space for the disabled person, or the general parking space as a target parking space;

in a determination process, determining a parking type and a parking trajectory based on a boarding position of the disabled person and the target parking space; and in a movement process, moving the vehicle to the target parking space based on the parking type and the parking trajectory, wherein the parking type is one of front parking or rear parking.

2. The method of claim 1, further comprising:

when the first parking space for the disabled person is selected as the target parking space in the selection process, in the determination process, determining the parking type and the parking trajectory so that the boarding position of the disabled person corresponds to the wheelchair activity space.

3. The method of claim 2, further comprising, when the wheelchair activity space is present on a left side of an entry direction of the first parking space for the disabled person, in the determination process:

determining the parking type as the front parking when the boarding position of the disabled person is a left seat; and determining the parking type as the rear parking when the boarding position of the disabled person is a right seat.

4. The method of claim 2, further comprising, when the wheelchair activity space is present on a right side of an entry direction of the first parking space for the disabled person, in the determination process:

determining the parking type as the rear parking when the boarding position of the disabled person is a left seat; and determining the parking type as the front parking when the boarding position of the disabled person is a right seat.

5. The method of claim 1, further comprising:

before the determination process, determining whether it is possible to exit the vehicle in the target parking space.

6. The method of claim 5, wherein determining whether it is possible to exit the vehicle in the target parking space comprises:

when there is at least one obstacle-free space among first reference spaces, determining that it is possible to exit the vehicle in the target parking space, and the first reference spaces are a space of a predetermined size located on both sides of the vehicle, assuming that the vehicle is completely parked in the target parking space.

7. The method of claim 6, wherein determining whether it is possible to exit the vehicle in the target parking space comprises:

when either the second parking space for the disabled person or the general parking space is selected as the target parking space in the selection process, and when it is determined that it is possible to exit the vehicle in the target parking space, determining the parking type and the parking trajectory so that the boarding position of the disabled person corresponds to the obstacle-free space among the first reference spaces.

8. The method of claim 7, wherein determining whether it is possible to exit the vehicle in the target parking space comprises, when the obstacle-free space among the first reference spaces is present on a left side of an entry direction of the target parking space:

determining the parking type as the front parking when the boarding position of the disabled person is a left seat; and determining the parking type as the rear parking when the boarding position of the disabled person is a right seat.

9. The method of claim 7, wherein determining whether it is possible to exit the vehicle in the target parking space comprises, when the obstacle-free space among the first reference spaces is present on a right side of an entry direction of the target parking space:

determining the parking type as the rear parking when the boarding position of the disabled person is a left seat; and determining the parking type as the front parking when the boarding position of the disabled person is a right seat.

10. The method of claim 6, wherein determining whether it is possible to exit the vehicle in the target parking space comprises, when either the second parking space for the disabled person or the general parking space is selected as the target parking space in the selection process, and it is determined that it is not possible to exit the vehicle in the target parking space:

determining the parking type as the rear parking when the boarding position of the disabled person is a front seat, and determining the parking type as the front parking when the boarding position of the disabled person is a rear seat.

11. The method of claim 10, further comprising:

in the movement process, stopping the vehicle when a portion of the vehicle enters the target parking space; and in the moving process, moving the vehicle again when all occupants of the vehicle have exited the vehicle.

12. The method of claim 11, further comprising:

in the movement process, stopping the vehicle before an imaginary first straight line passing through the vehicle enters the target parking space; and in the moving process, moving the vehicle again when all occupants of the vehicle have exited the vehicle.

13. The method of claim 11, further comprising:

in the movement process, stopping the vehicle when a portion of the vehicle enters the target parking space; and in the movement process, after instructing occupants of the vehicle to exit the vehicle using a user interface disposed inside the vehicle, moving the vehicle again when all occupants of the vehicle have exited the vehicle.

14. A parking system for a vehicle occupied by a disabled person, the system comprising:

a sensor unit configured to sense surroundings of the vehicle and generate sensing data; and a processor configured to search for empty spaces around the vehicle using the sensing data, determine an empty space having a width less than a critical width or having a length less than a critical length, among the empty spaces, as a no-parking space, determine an empty space in which a disabled mark and a hatched pattern are detected, and in which a sufficient space is available for placing a wheelchair, among the empty spaces, as a first parking space for the disabled person, determine an empty space in which only the disabled mark is detected and the hatched pattern is not detected, or in which the disabled mark is detected but the space is insufficient for placing a wheelchair, among the empty spaces, as a second parking space for the disabled person, categorize each of the empty spaces into the no-parking space, the first parking space for the disabled person with a wheelchair activity space, the second parking space for the disabled person without the wheelchair activity space, and a general parking space, select one of the first parking space for the disabled person, the second parking space for the disabled person, or the general parking space as a target parking space, determine a parking type and a parking trajectory based on a boarding position of the disabled person and the target parking space, and move the vehicle to the target parking space based on the parking type and the parking trajectory, wherein the parking type is one of front parking or rear parking.

15. The parking system of claim 14, further comprising:

a user interface including an input means configured to manually register and change the boarding position of the disabled person.

16. The parking system of claim 15, wherein the user interface is configured to display on a screen one or more of the no-parking space, the first parking space for the disabled person, the second parking space for the disabled person, or the general parking space based on the boarding position of the disabled person.

* * * * *